United States Patent
Barron-Kraus et al.

(10) Patent No.: US 10,783,060 B2
(45) Date of Patent: Sep. 22, 2020

(54) POST-UPGRADE DEBUGGING IN A REMOTE NETWORK MANAGEMENT PLATFORM

(71) Applicant: ServiceNow, Inc., Santa Clara, CA (US)

(72) Inventors: Kyle James Barron-Kraus, East Lansing, MI (US); Broc William Oppler, Valencia, CA (US)

(73) Assignee: ServiceNow, inc., Santa Clara, CA (US)

( * ) Notice: Subject to any disclaimer, the term of this patent is extended or adjusted under 35 U.S.C. 154(b) by 329 days.

(21) Appl. No.: 15/969,517

(22) Filed: May 2, 2018

(65) Prior Publication Data
US 2019/0340109 A1    Nov. 7, 2019

(51) Int. Cl.
*G06F 11/00*   (2006.01)
*G06F 11/36*   (2006.01)
*G06F 8/65*    (2018.01)

(52) U.S. Cl.
CPC ............ *G06F 11/3664* (2013.01); *G06F 8/65* (2013.01)

(58) Field of Classification Search
CPC ............. G06F 9/45558; G06F 9/45533; G06F 9/4856; G06F 2009/45562; G06F 2009/45591; G06F 2009/45595; G06F 11/3664; H04L 41/5035; H04L 41/046
See application file for complete search history.

(56) References Cited

U.S. PATENT DOCUMENTS

| | | | | |
|---|---|---|---|---|
| 5,619,621 | A * | 4/1997 | Puckett | G06F 11/2257 706/45 |
| 6,385,768 | B1 * | 5/2002 | Ziebell | G06F 8/71 707/999.202 |
| 7,225,137 | B1 * | 5/2007 | Barritz | G06Q 10/06 705/348 |
| 7,644,414 | B2 * | 1/2010 | Smith | G06F 8/20 709/201 |
| 10,373,218 | B1 * | 8/2019 | Jenkins | G06Q 30/06 |
| 2003/0229467 | A1 * | 12/2003 | Lara | G06F 11/2635 702/119 |
| 2004/0236820 | A1 * | 11/2004 | Flocken | G06F 11/0748 709/200 |
| 2005/0114500 | A1 * | 5/2005 | Monk | H04L 43/00 709/224 |

(Continued)

*Primary Examiner* — Bryce P Bonzo
*Assistant Examiner* — Jeison C Arcos
(74) *Attorney, Agent, or Firm* — Fletcher Yoder PC

(57) ABSTRACT

An example embodiment may involve receiving, from a client device, a request to access a web-based resource of a computational instance. One or more server devices disposed within the instance may be configured to be able to execute a plurality of program code units. A software application may be configured to identify one or more of the program code units that, since a previous software release for the instance or in a subsequent software release for the instance, have been modified or added, and store a corresponding change indication for each identified program code unit. The embodiment may also involve, as part of carrying out the request, executing a subset of the program code units, and may further involve generating and providing for display a representation of the web-based resource including a region specifying each of the subset of program code units for which there is a stored change indication.

20 Claims, 15 Drawing Sheets

(56) References Cited

U.S. PATENT DOCUMENTS

| | | | | |
|---|---|---|---|---|
| 2005/0120160 | A1* | 6/2005 | Plouffe | G06F 9/4856 711/1 |
| 2006/0265708 | A1* | 11/2006 | Blanding | G06F 8/65 717/174 |
| 2008/0256564 | A1* | 10/2008 | Fathalla | G06F 9/45537 719/331 |
| 2009/0276771 | A1* | 11/2009 | Nickolov | H04L 67/1014 717/177 |
| 2009/0328221 | A1* | 12/2009 | Blumfield | G06F 21/564 726/24 |
| 2011/0296382 | A1* | 12/2011 | Pasternak | G06F 11/3688 717/124 |
| 2011/0296383 | A1* | 12/2011 | Pasternak | G06F 11/3688 717/124 |
| 2013/0219363 | A1* | 8/2013 | Wu | G06F 9/45558 717/124 |
| 2014/0006617 | A1* | 1/2014 | Lakshman | H04L 63/102 709/225 |
| 2015/0199197 | A1* | 7/2015 | Maes | G06F 11/3672 717/122 |
| 2017/0187761 | A1* | 6/2017 | Zhu | H04L 65/1073 |
| 2017/0351599 | A1* | 12/2017 | Elimeleh | G06F 11/3688 |
| 2017/0372247 | A1* | 12/2017 | Tauber | G06F 11/3668 |

* cited by examiner

|  | Previous Software Release | Subsequent Software Release |
|---|---|---|
| Modified | Category 1<br>Category 2 | Category 3 |
| New | Category 2 | Category 3 |

Task
New record

Number: TASK0021763

Assigned to:

Configuration item:

Active:

Short description:

Description:

Work notes:

*Assignment group:

Submit   Names

Priority: Low

State: Open

Parent:

▲ Skipped During Last Upgrade
▲ Enterprise Customized
▲ Modified During Last Upgrade

700

≡ Task
   New record

▼ Skipped During Last Upgrade

| Name | Type | Last modified |
|---|---|---|
| Example Client Script | Client Script | 2018-02-26 23:23:40 |

▼ Enterprise Customized

| Name | Type | Last modified |
|---|---|---|
| Example Client Script | Client Script | 2018-02-26 23:23:40 |
| UIPolicyBuilder | Script Include | 2018-02-23 21:07:14 |
| This is a test client script | Client Script | 2018-02-01 19:03:06 |
| Make assignment group mandatory | UI Policy | 2018-01-25 22:39:09 |
| onChange | Client Script | 2018-01-25 18:47:09 |
| Hide related listss | Client Script | 2018-01-24 23:52:43 |
| Namesss | UI Action | 2018-01-24 17:12:41 |

▼ Modified During Last Upgrade

| Name | Type | Last modified |
|---|---|---|
| onSubmit | Client Script | 2018-02-22 15:39:45 |

RECEIVE, BY A WEB SERVER SOFTWARE APPLICATION EXECUTING ON ONE OR MORE SERVER DEVICES, FROM A CLIENT DEVICE OF A MANAGED NETWORK, A REQUEST TO ACCESS A WEB-BASED RESOURCE OF A COMPUTATIONAL INSTANCE OF A REMOTE NETWORK MANAGEMENT PLATFORM, WHERE THE COMPUTATIONAL INSTANCE IS ASSOCIATED WITH THE MANAGED NETWORK, WHERE THE ONE OR MORE SERVER DEVICES ARE DISPOSED WITHIN THE COMPUTATIONAL INSTANCE AND CONFIGURED TO BE ABLE TO EXECUTE A PLURALITY OF PROGRAM CODE UNITS, WHERE A SOFTWARE APPLICATION, EXECUTING ON A COMPUTING DEVICE DISPOSED WITHIN THE COMPUTATIONAL INSTANCE, MAY BE CONFIGURED TO IDENTIFY ONE OR MORE OF THE PROGRAM CODE UNITS THAT, SINCE A PREVIOUS SOFTWARE RELEASE FOR THE COMPUTATIONAL INSTANCE OR IN A SUBSEQUENT SOFTWARE RELEASE FOR THE COMPUTATIONAL INSTANCE, HAVE BEEN MODIFIED OR ADDED, AND STORE FOR EACH OF THE IDENTIFIED PROGRAM CODE UNITS, A CORRESPONDING CHANGE INDICATION ← 800

AS PART OF CARRYING OUT THE REQUEST TO ACCESS THE WEB-BASED RESOURCE, EXECUTE, BY THE WEB SERVER SOFTWARE APPLICATION, A SUBSET OF THE PROGRAM CODE UNITS ← 802

GENERATE AND PROVIDE, BY THE WEB SERVER SOFTWARE APPLICATION, FOR DISPLAY ON A WEB-BASED GRAPHICAL USER INTERFACE OF THE CLIENT DEVICE, A REPRESENTATION OF THE WEB-BASED RESOURCE THAT INCLUDES A REGION SPECIFYING EACH OF THE SUBSET OF PROGRAM CODE UNITS FOR WHICH THERE IS A STORED CHANGE INDICATION ← 804

FIG. 8

POST-UPGRADE DEBUGGING IN A REMOTE NETWORK MANAGEMENT PLATFORM

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform.

Furthermore, the remote network management platform may have a multi-instance architecture that provides each enterprise with its own database in a dedicated computing instance. This prevents commingling of enterprise data and allows each instance to be independently managed. For example, when one enterprise's instance experiences an outage due to errors or an upgrade, other computational instances are not impacted.

SUMMARY

An enterprise or other entity can use a computational instance to access a web-based resource (e.g., a web page) provided by the remote network management platform. In an attempt to access a web-based resource, the enterprise's client device may send a request to a server, and the server then processes the request and provide the web-based resource to the client device. The act of the server processing the request may involve the server executing one or more program code units that define how the web-based resource operates, is accessed, is designed, and/or the information it provides.

As a general matter, a given program code unit may be deployed, by the remote network management platform, on the computational instance by way of a software release for the computational instance. Thereafter, the enterprise, for a variety of reasons, might or might not elect to modify the program code unit. Additionally or alternatively, the enterprise might elect to add its own program code unit or units to the computational instance.

Every so often, the computational instance may be upgraded from one software release to another, typically in an effort to add new features to the computational instance and/or to improve existing features of the computational instance. These upgrades typically include changes to program code units and/or other data that was deployed on the computational instance in the previous software release.

In some scenarios, however, an upgrade can result in the enterprise experiencing problems when attempting to access web-based resources, such as the inability to access certain web-based resources. Further, because numerous (e.g., hundreds) of program code units may be executed in such attempts, it may be difficult to determine the cause of the problems that result after the upgrade.

Therefore, in accordance with the present disclosure, when carrying out a request to access a web-based resource after an upgrade has taken place, the computational instance may identify, from the program code units that are being executed while carrying out the request, one or more program code units that meet certain criteria—namely, program code units that have been modified or added by the enterprise and/or changed by the upgrade. The computational instance may then display the identified program code unit(s). As such, the enterprise may be able to efficiently narrow down the causes of problems that occur after an upgrade has taken place. In many cases, of the potentially hundreds of program code units that are executed, only a few (e.g., ten or less) may be displayed.

Accordingly, a first example embodiment may involve receiving, by a web server software application executing on one or more server devices, from a client device of a managed network, a request to access a web-based resource of a computational instance of a remote network management platform. The computational instance may be associated with the managed network. The one or more server devices may be disposed within the computational instance and may be configured to be able to execute a plurality of program code units. A software application, executing on a computing device disposed within the computational instance, may be configured to identify one or more of the program code units that, since a previous software release for the computational instance or in a subsequent software release for the computational instance, have been modified or added, and store for each of the identified program code units, a corresponding change indication.

The first example embodiment may also involve, as part of carrying out the request to access the web-based resource, executing, by the web server software application, a subset of the program code units. The first example embodiment may also involve generating and providing, by the web server software application, for display on a web-based graphical user interface of the client device, a representation of the web-based resource that includes a region specifying each of the subset of program code units for which there is a stored change indication.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7C illustrates a GUI, in accordance with example embodiments.

FIG. 7D illustrates a GUI, in accordance with example embodiments.

FIG. 7E illustrates a GUI, in accordance with example embodiments.

FIG. 7F illustrates a GUI, in accordance with example embodiments.

FIG. 8 is a flow chart, in accordance with example embodiments.

DETAILED DESCRIPTION

Figure 1:
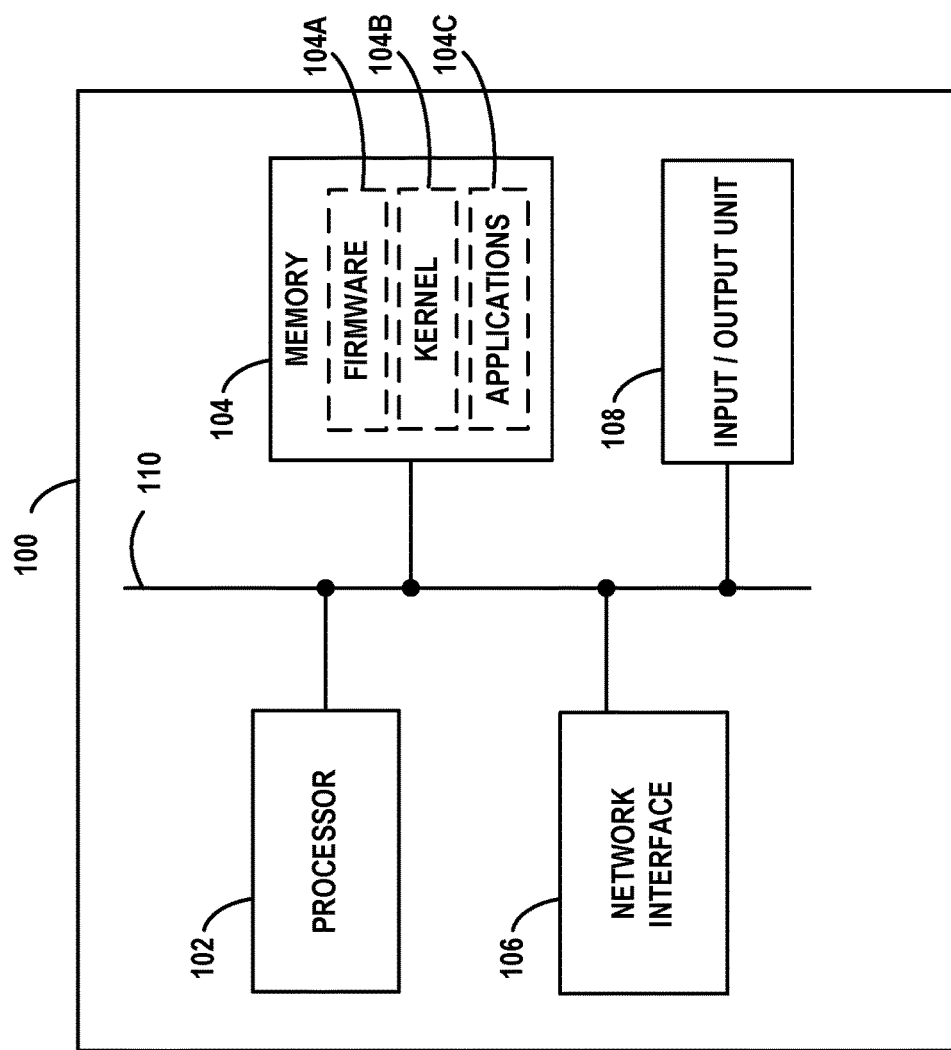
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100.

Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
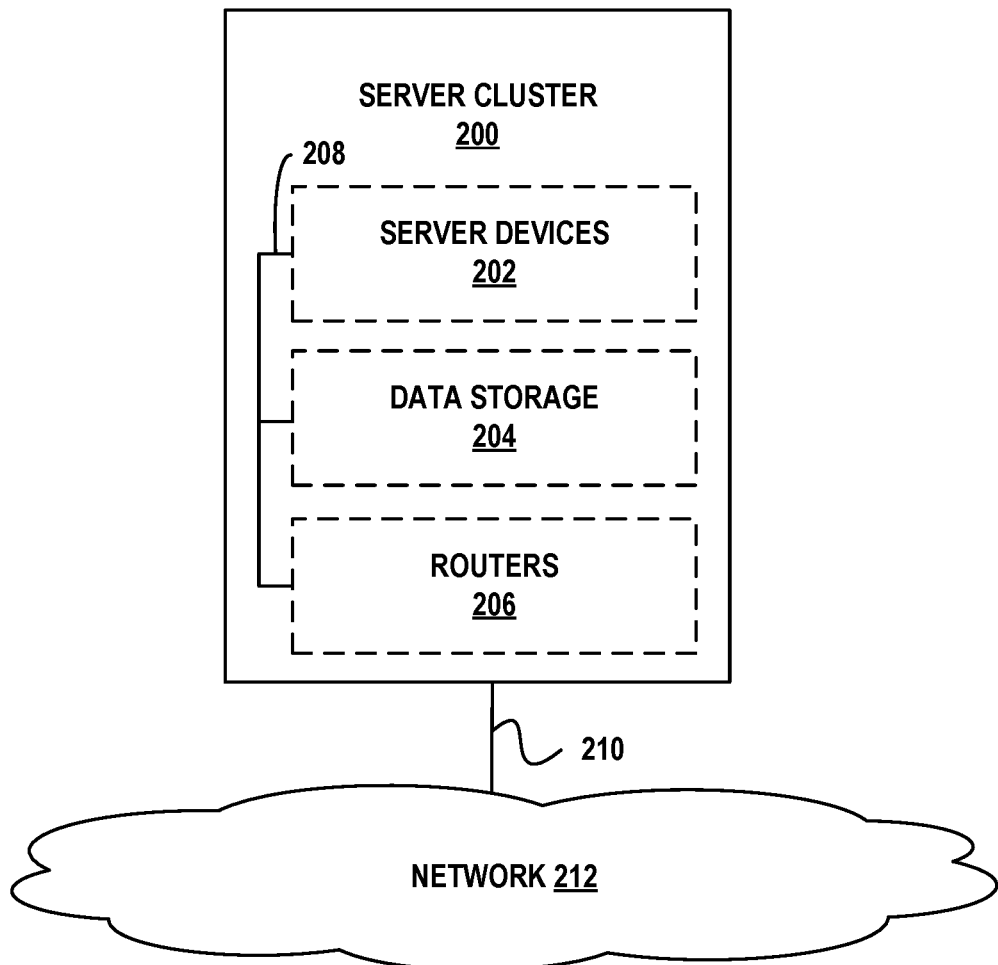
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
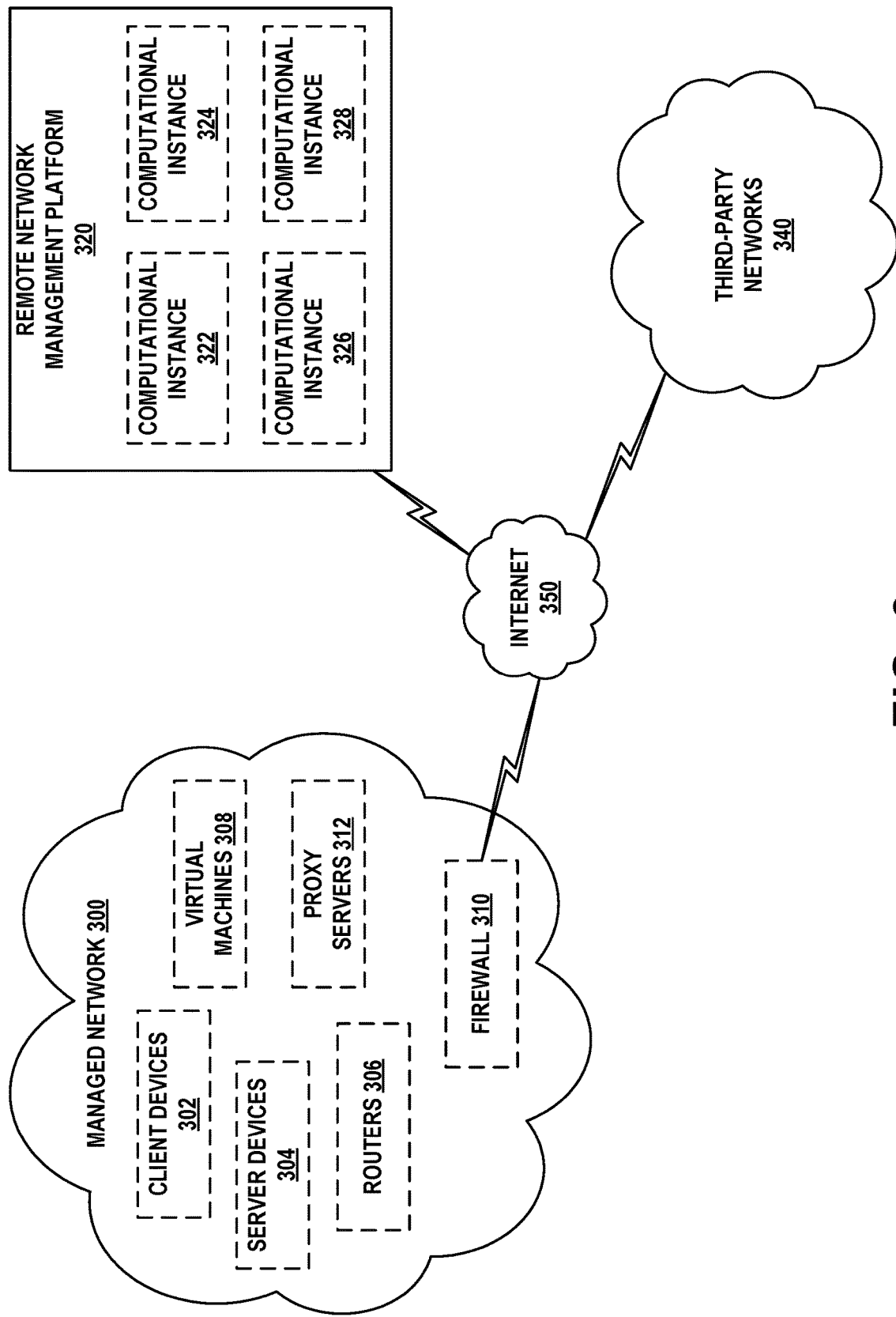
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200)

that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
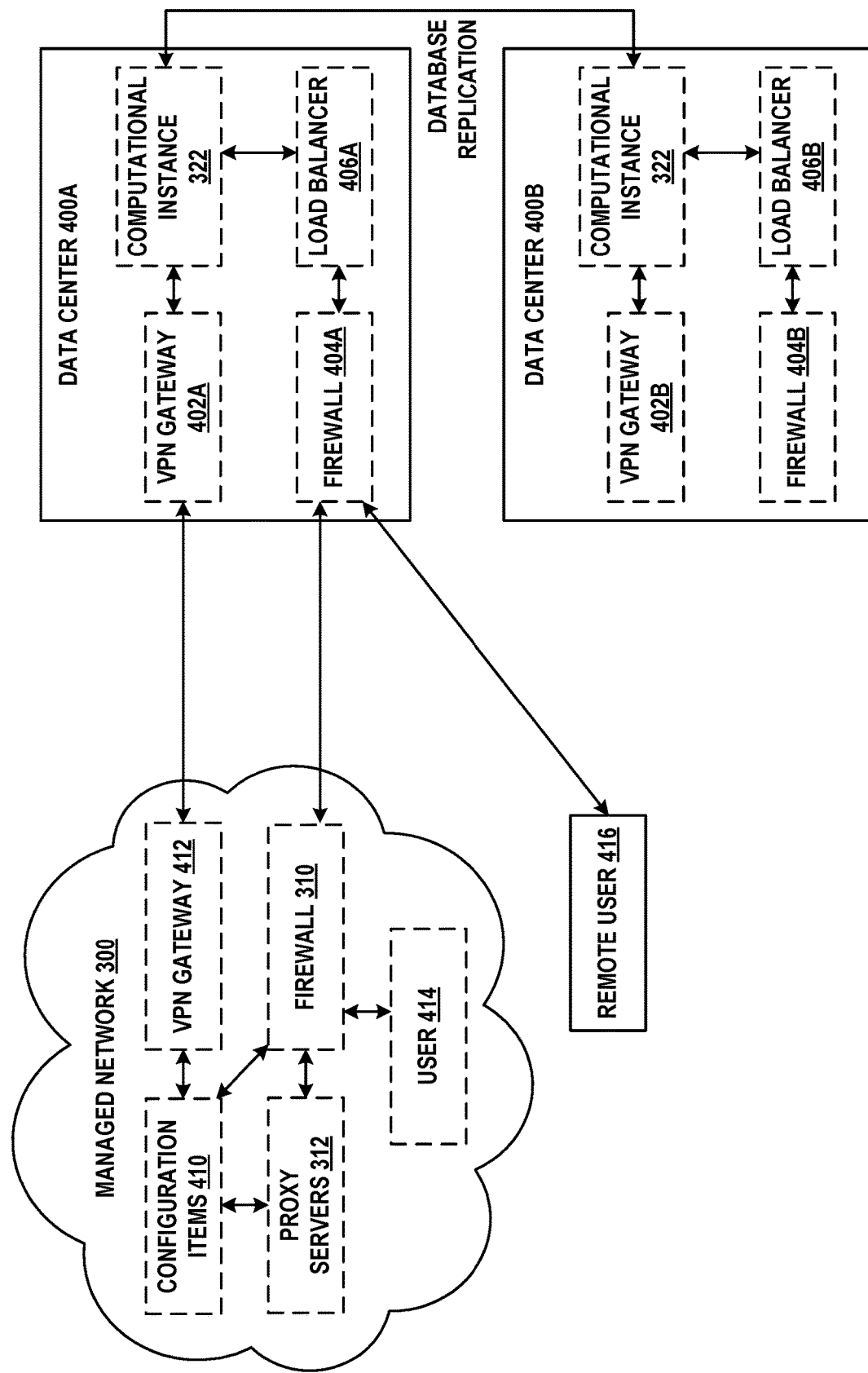
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
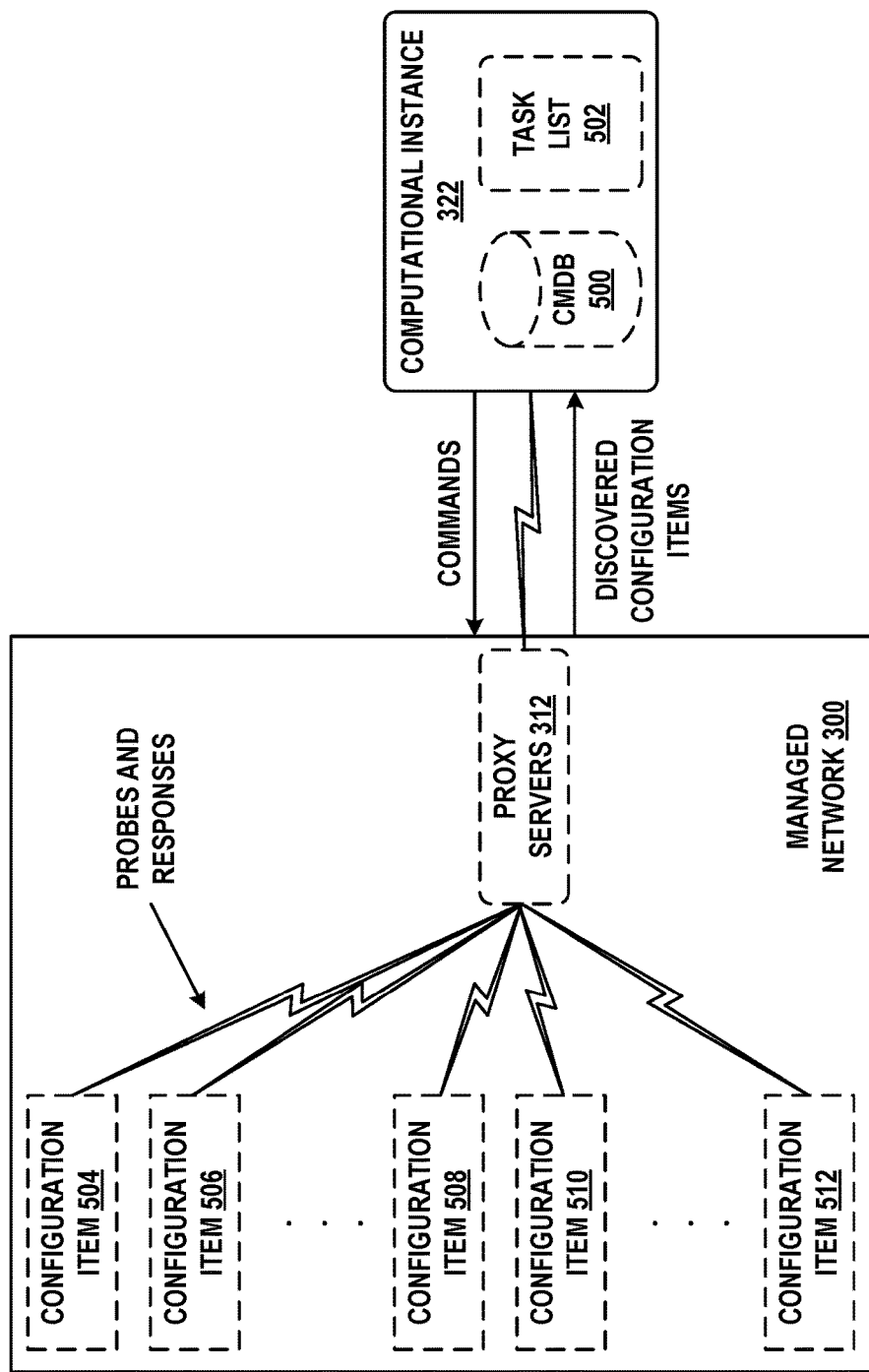
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
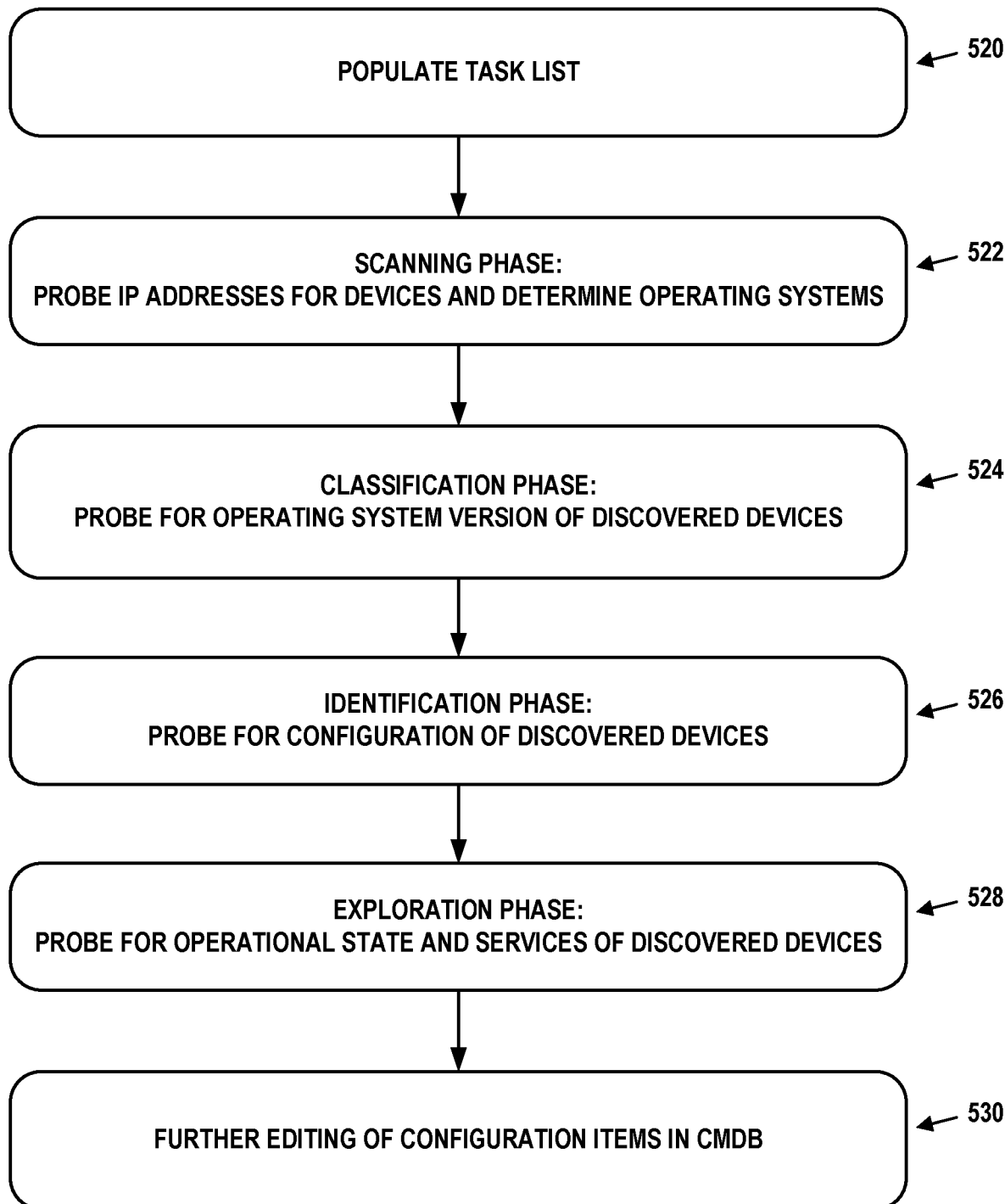
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE DEBUGGING FEATURE OPERATIONS

An enterprise or other entity associated with managed network 300 may use a computational instance (e.g., computational instance 322) of the remote network management platform 320 to access various web-based resources provided by the remote network management platform 320. A "web-based resource" may refer to any data or program code (e.g., a web page or other information) accessible by way of a transaction between a client device 302 and a web server (e.g., a web server application executing on a web server), where the web server is disposed within the computational instance 322. Further, a "transaction" may refer to any request transmitted from the client device 302 to the web server in an attempt to access a web-based resource. Upon receipt of such a request, the web server may process the request and, if the attempt is successful, the web server may provide a representation of the requested web-based resource to the client device 302.

For example, the enterprise may use a web browser on the client device 302 to enter a request to load a web page of the remote network management platform's web portal, and the web server may responsively provide the web page for display. As another example, the enterprise can request access to a web-based resource using a representational state transfer (REST) application programming interface (API) of the computational instance 322. Through this REST API, the client device 302 may engage in Hypertext Transfer Protocol (HTTP) communication with the web server to gain access to the web-based resource. The act of requesting access to the web-based resource may be referred to as a REST API call, and may involve the client device 302 transmitting a request to the web server in the form of a URL or other string identifying the web-based resource. Upon receipt of the request, the web server may process the request and transmit, to the client device 302, the web-based resource represented in HTML, XML, JavaScript Object Notation (JSON), or some other format.

On the other hand, if the attempt to access the web-based resource is unsuccessful, the web server may provide to the client device 302 an indication that the attempt was unsuccessful, such as a different version of the requested web-based resource (e.g., a web page with missing information) and/or a web page including an error message.

As noted above, when processing a request to access a web-based resource, the web server can execute one or more program code units—namely, executable code, scripts, and/or other data—that define how the web-based resource operates, is accessed, is designed, and/or the information it provides.

By way of example, a program code unit can take the form of a record-based rule that defines actions that can be performed with respect to a record stored in a database (e.g., data storage 204). A record-based rule may be a server-side script that runs when a record stored in a database is displayed, inserted, updated, or deleted, or when a table in the database is queried. Record-based rules can be used to perform a variety of actions, such as specifying field values on a form that the user is updating, displaying messages to the user, preventing the user from accessing or modifying certain fields on a form, or preventing the user from adding new records in the database when certain criteria are met. Other actions are possible as well.

As another example, a program code unit can take the form of a user interface (UI) page. A UI page may be client-side and/or server-side code defining forms, dialogs, lists, or other UI components that make up a custom web page associated with a particular application or service. That code, when executed, may cause the custom web page to be provided and may facilitate subsequent interactions with the custom web page.

Additionally or alternatively, other such program code units can include UI macros (e.g., discrete, custom scripted controls or interfaces that can be added to a UI), UI actions (e.g., code defining operations related to buttons, links, and context menu items on forms and lists), UI policies (e.g., code or scripts that define how the behavior of information on a form can change and/or that define process flows for completing tasks), client scripts (e.g., client-side JavaScript that runs in a web browser), data policies (e.g., rules applied to data entered into the computational instance or received through web services), and/or script includes (e.g., server-side scripts that define a function or class), among other possible program code units. Variations of the program code units listed above are possible as well.

Typically, a software release for the computational instance 322 may include a variety of standard program code units that are associated with the remote network management platform 320 and that have been approved by an entity (e.g., a service provider) associated with the remote network management platform 320 for inclusion in that release. Still, the remote network management platform 320 may support features that enable enterprises to customize the computational instance 322 by adding new program code units and/or modifying existing program code units (i.e., modifying a standard program code unit of a previous software release, or making a subsequent modification to a previously-modified standard program code unit). Similarly, enterprises may add new database tables and/or modify entries in existing database tables.

From time to time, the computational instance 322 may undergo an upgrade during which the computational instance 322 is transitioned from one software release to a subsequent software release—namely, an upgrade from any previous software release preceding the subsequent software release to the subsequent software release. For example, the computational instance 322 may download an upgrade file that defines various changes between the previous software release and the subsequent software release, and the computational instance 322 may then apply some or all of those changes to itself. In line with the discussion above, such changes may include changes to program code units (e.g., adding new program code units or modifying existing program code units) and/or changes to other data associated with such program code units (e.g., modifying or deleting a database table that is queried when a record-based rule script is run). However, when carrying out the upgrade, the computational instance 322 may be configured to not make (i.e., skip) certain changes in some scenarios. For example, the upgrade file may define a change to a particular standard program code unit, but the computational instance 322 may detect that the particular standard program code unit has been modified by the enterprise, in which case the computational instance 322 might not apply the change. Other scenarios are possible as well.

Unfortunately, the various changes that are made (or not made) to the computational instance 322 as a result of an upgrade may cause problems when attempting to access web-based resources. Consider for example a scenario in which, before the upgrade, the enterprise added a record-based rule that runs while viewing a form on a web page and queries a particular database table for fields to display on the form. The remote network management platform 320 then releases an upgrade that, once implemented on the computational instance 322, removes the particular database table. Thereafter, when the enterprise attempts to access the form on the web page, the record-based rule may fail in its attempt to query the particular database table because the particular database table no longer exists. Thus, the enterprise may be unable to view the fields for which the particular database table was to be queried, or may be unable to access the form at all. Other types of errors or undesirable behavior are possible as well.

Furthermore, due to the large quantity (e.g., hundreds) of program code units that may be executed in an attempt to access a web-based resource, it may be difficult to determine the cause of any such errors resulting from the attempt. This difficulty may be compounded when multiple such attempts are made to access multiple different web-based resources.

Therefore, in accordance with the present disclosure, the remote network management platform 320 may be configured to provide a debugging feature that enables the enterprise to efficiently narrow down the causes of such problems after an upgrade to the computational instance 322 has taken place. In particular, while carrying out a request to access a web-based resource, a web server (or multiple web servers) disposed within the computational instance 322 may identify program code units that are "relevant" to the transaction, meaning any one or more program code units that were executed in the transaction that have been customized by the enterprise and/or changed by the upgrade. The web server may then provide the relevant program code units for display on a web-based GUI. As a result, the enterprise can view the relevant program code units and attempt to determine which of the relevant program code units might have been the cause of the problem.

The debugging feature may provide various advantages. For example, the debugging feature may provide the enterprise with the ability to view relevant program code units on a per-transaction basis. In particular, when a particular transaction occurs, the debugging feature may identify and display relevant program code units, as opposed to identifying and displaying program code units related to multiple transactions. In this way, the enterprise can focus on searching through the relevant program code units and narrowing down the cause of errors that pertain to the transaction without having to navigate through other program code units that were executed during other transactions. Furthermore, since there may be scenarios in which numerous program code units are executed during a transaction, the web server may thus save processing time and power in being configured to only identify relevant program code units. Other advantages are possible as well.

To facilitate the identification of program code units relevant to a particular transaction, a computing device (e.g., a server) of the computational instance 322 may be configured to maintain records related to various program code units. In particular, a software application installed on such a computing device may be configured to identify program code units that have been changed and store, for each such program code unit, a corresponding change indication—namely, data indicating the change. For example, for a given program code unit, a corresponding change indication may indicate that, since a previous software release or in a subsequent software release, the given program unit has been modified or added. In particular, the change indication may indicate that the program code unit has been (i) modified by the enterprise since the previous software release, (ii) added to the previous software release by the enterprise since the previous software release, and/or (iii) changed by the upgrade (i.e., modified or added by the remote network management platform in the subsequent software release). Such change indications may be stored in response to the server determining that such modifications or additions have occurred. In some embodiments, the database may include a table that includes, for each program code unit, an identifier of the program code unit (e.g., an alphanumeric string, such as a name or number associated with the program code unit) and a corresponding change indication for the program code unit.

The change indication may specify the modification or addition with varying granularity. In some embodiments, for example, the change indication might specify to a binary degree whether a program code unit has been modified or added, or rather has not been modified or added. In other embodiments, the change indication might particularly specify whether the program code unit was (i) modified by the enterprise since the previous software release, (ii) added to the previous software release by the enterprise since the previous software release, and/or (iii) changed by the upgrade. In still other embodiments, the change indication might include a description or other indicator of how the program code unit was modified or added. For example the change indication might include data defining a comparison of a snapshot of the program code unit before the upgrade with a snapshot of the program code unit after the upgrade. Additionally or alternatively, the change indication might include an identifier of a user who modified or added the program code unit. Other examples are possible as well.

In some embodiments, when a particular transaction occurs, the web server may be configured to first determine all program code units that are executed as part of the transaction, regardless of whether the program code units were customized by the enterprise or changed by the upgrade. In such embodiments, the web server may then identify which of those program code units are relevant. In other embodiments, however, the web server may be configured to identify only relevant program code units. There may be scenarios in which numerous program code units are executed during a transaction, and thus the web server may save processing time and power in being configured to only identify relevant program code units.

In some embodiments, the acts of identifying changes to program code units and storing change indications for those identified program code units can occur independently from the act of executing program code units for a particular transaction. That is, the computational instance 322 may perform the acts of identifying changes to program code units and storing change indications for those identified program code units in normal operation, other than when a transaction is occurring and when the debugging feature is being used. In other embodiments, however, those acts could be performed in response to a transaction being initiated or while the transaction is being carried out.

In some embodiments, the web server may be configured to generate and display a listing of relevant program code units grouped together. Such a listing may include respective change indications for each program code unit, and/or may include additional information associated with each program code unit. The additional information may include attributes such as a name of the program code unit, a type of the program code unit (e.g., record-based rule, UI page), and/or date/time of last modification to the program code unit. Other examples are possible as well.

In some embodiments, the web server may be configured to group relevant program code units into one or more categories, and then generate and display listings of the program code units in the one or more categories. To facilitate this, the web server may have a set of one or more predefined categories and may determine, for each program code unit, the predefined category to which the program code unit belongs. By grouping relevant program code units on a per-transaction basis, the debugging feature may help the enterprise to even further narrow down the cause of an error, thereby further improving the efficiency of the debugging process.

In these embodiments, the one or more categories might take various forms. One example category might include one or more program code units that were modified by the enterprise since the previous software release. Another example category might include one or more program code units that were added to the previous software release by the enterprise since the previous software release. Yet another example category might include one or more program code units that were changed by the upgrade. Other example categories are possible as well.

Further, any two or more of the categories described above could be combined such that program code units of each such category are grouped together. For example, one such category could include any one or more program code units that were modified by the enterprise since the previous software release, and could further include any one or more program code units that were added to the previous software release by the enterprise since the previous software release.

Figure 6:
FIG. 6 is an example table illustrating groupings of program code units, in accordance with example embodiments.

In line with the discussion above, FIG. 6 is an example table 600 illustrating four possibilities of how program code units can be modified or added, and thus how categories can be used to capture these possibilities. As shown, program code units that were modified by the enterprise since the previous software release are grouped under a first category, Category 1, and also fall under a second, broader category, Category 2. In addition, program code units that were added to the previous software release by the enterprise since the previous software release are grouped under Category 2 as well. Further, program code units that were modified in the subsequent software release are grouped under a third category, Category 3. Lastly, program code units that were added in the subsequent software release are grouped under Category 3 as well.

As discussed above, when an upgrade file defines a change to a standard program code unit of a previous software release and the computational instance 322 detects that the enterprise has modified the standard program code unit since the previous software release, the computational instance 322 might not apply the change, so as to not make any further modification to the program code unit. (Otherwise, the enterprise's changes could be lost.) In some embodiments, a category that includes one or more program code units that were modified by the enterprise since the previous software release (e.g., Category 1) might define, and thus might be displayed to indicate, that the one or more program code units having that category were skipped by the upgrade.

Regardless of whether the relevant program code units are grouped into categories, the web server may be configured to display attributes and/or other additional information associated with the relevant program code units. Some or all of these attributes and/or additional information might be viewable on a single web page via drop-down menus. Additionally or alternatively, user input selecting a particular program code unit on a first web page may cause the web server to display a new web page including the attributes and/or additional information. It may be helpful for the enterprise to view attributes and other information associated with each program code unit in this manner, as it can even further improve the efficiency with which the enterprise narrows down the cause of an error.

As noted above, the attributes might include a name, type, and/or date/time of last modification of the program code unit. Other possible information might include a change history of the program code unit, which may indicate how and when the program code unit was changed. For example, the change history might include a list of versions of the program code unit. As a more specific example, if the program code unit is a standard program code unit that is changed by the upgrade and not by the enterprise, the change history might include two versions of the program code unit. Further, the change history might include, for each version of the program code unit, a name or other identifier of the version (e.g., a version number), a state of the version (e.g., previous or current), and a source of the version (e.g., the name or other identifier of a set of configuration changes from which the version originated or was derived), among other possibilities. In some embodiments, each version of the program code unit may be displayed as a selectable link that, when selected, causes the web server to generate and display the version of the program code unit, and perhaps additionally a view showing how the version of the program code unit is different from at least one other version of the program code unit.

After the web server has identified, and perhaps grouped, relevant program code units for a given transaction, the web server may be configured to generate and display, on a web-based GUI of the client device 302, a representation of the web-based resource that was the subject of the transaction, where the representation of the web-based resource includes a region specifying the relevant program code units.

The representation of the web-based resource may take the form of a web page and may indicate to some degree whether the attempt to access the web-based resource was successful or not. When the attempt is unsuccessful, it may be immediately apparent to the enterprise, since the enterprise may expect the web-based resource to behave (e.g., appear) in a particular way and the attempt may result in the web-based resource behaving different from what is expected. Additionally or alternatively, the attempt may result in a web page that includes a "Page Not Found" message or other error notification. However, the web server may be configured in some embodiments to display relevant program code units even if the attempt to access the web-based resource is successful.

The region may appear at various locations of the representation of the web-based resource. For example, the region may appear at the bottom of a web page. As another example, the region may appear as a pop-up window or separate tab or window in a web browser that displays the representation. Other examples are possible as well.

In some embodiments, the web server may be configured to display a program code unit in the region with an associated selectable link that, when selected via user input, causes the web server to generate and display a detailed view page including additional information associated with the program code unit. The detailed view page may include various information, such as the attributes, change history, or other information described above. Additionally or alternatively, the detailed view page may enable the enterprise to view, modify, or delete the program code unit. For example, if the selected program code unit is a client script, the detailed view page may enable the enterprise to view the client script, make modifications to the client script, or delete the client script. This may be particularly useful in diagnosing an error. Once the enterprise suspects or is certain that a particular program code unit is the cause of an error, the enterprise can view the program code unit, and perhaps then modify, disable, or delete the program code unit in an attempt to resolve the error.

In some embodiments, the same type of transaction may be attempted multiple times (e.g., multiple different attempts to load the same web page), and thus the web server may be configured to determine and store a record of the relevant program code units for each time the transaction occurs, and perhaps additionally an indication of whether the transaction was successful or unsuccessful. Further, the web server may be configured to generate and display the record in the region or in another format. In this manner, the enterprise may be able to view any changes between the relevant program code units for one attempt to access a web-based resource and the relevant program code units for another, different attempt to access the web-based resource. Consider for example a scenario where the enterprise accidentally deletes a program code unit that is typically executed when attempting to access a particular web-based resource. The enterprise may then attempt to access the particular web-based resource again, but the attempt may be unsuccessful. The enterprise can then view the record, which may identify that the program code unit was deleted, as well as a date/time when the program code was deleted. The ability to compare the relevant program code units and/or results of multiple different attempts at accessing a web-based resource may be another valuable feature that can enable the enterprise to determine a source of an error.

In some embodiments, the computational instance 322 may enable the enterprise to toggle the debugging feature on (i.e., enabled) and off (i.e., disabled) at any time. When the debugging feature is enabled, the debugging feature may be visually provided on all GUI web pages as the enterprise navigates through the computational instance 322, or may be provided on only one or more predefined web pages.

FIGS. 7A-7G are example web-based GUIs that can be provided by a web server application, in accordance with example embodiments.

Figure 7A:
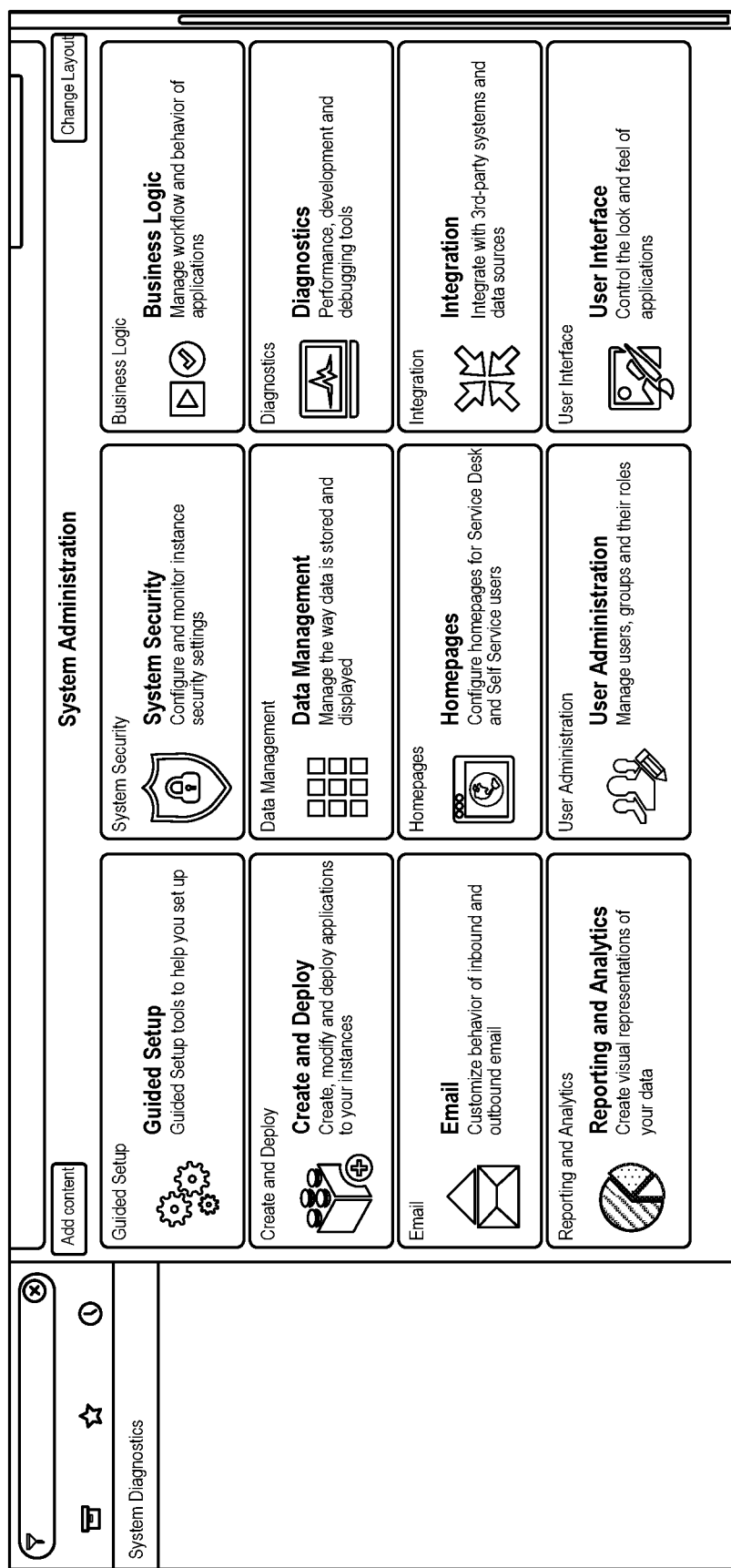
FIG. 7A illustrates a graphical user interface (GUI), in accordance with example embodiments.

FIG. 7A is an example GUI in the form of a system administration web page provided by the web server application. In particular, shown is an example of how the system administration web page might appear when the debugging feature is disabled.

In an example scenario, an enterprise (e.g., a user associated with the enterprise) may attempt to load the system administration web page, but may encounter some form of an error. The enterprise may then take action to enable the debugging feature, which in turn may identify program code units that are relevant to the attempt to load the system administration web page.

Figure 7B:
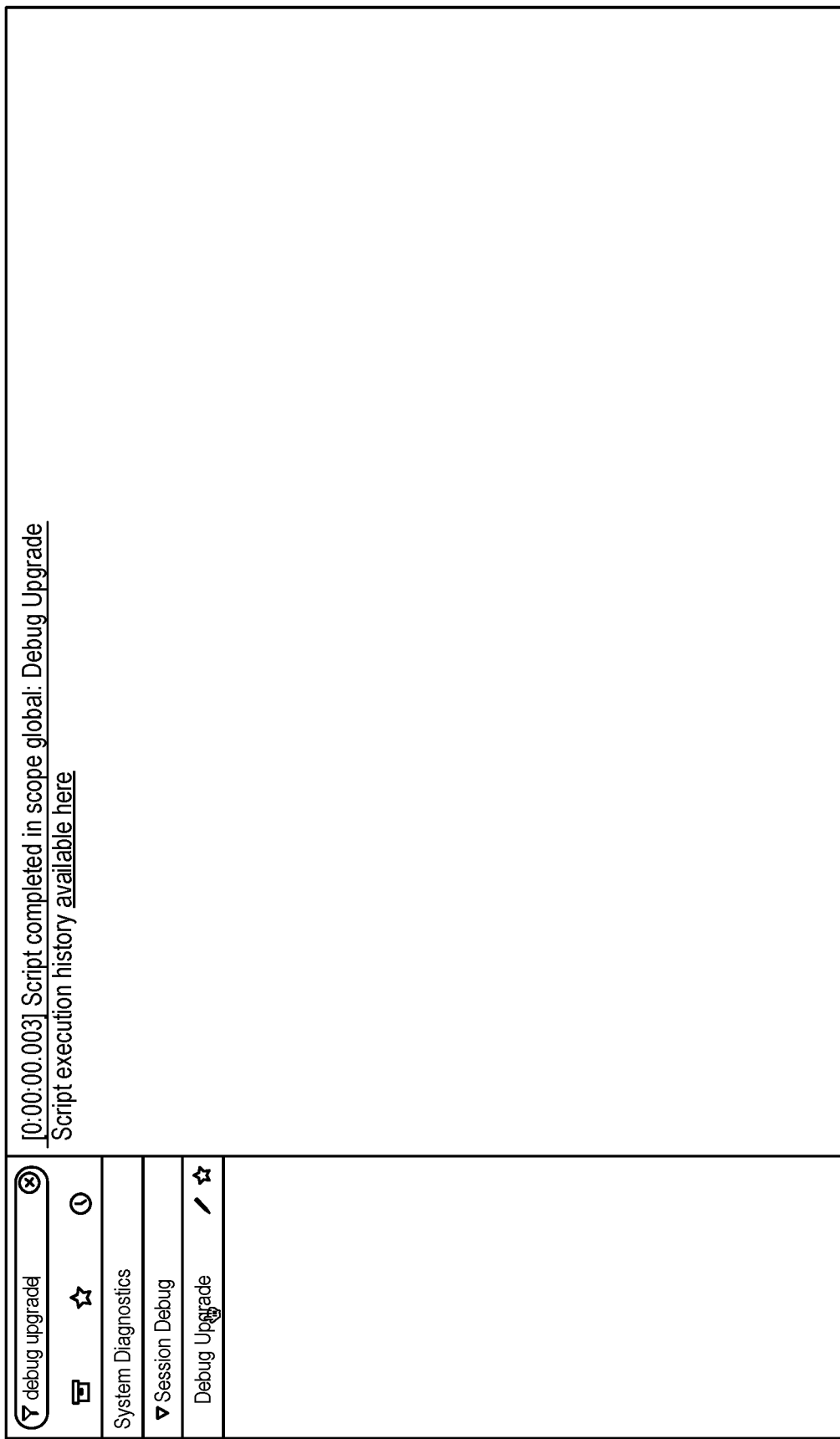
FIG. 7B illustrates a GUI, in accordance with example embodiments.

FIG. 7B is an example GUI in the form of a web page that might be displayed after the debugging feature has been enabled. As shown on the left-hand side of the web page, the enterprise has searched for "debug upgrade" and selected to enable the debugging feature. Further, the web page shown in FIG. 7B includes a message ("script completed in scope global") indicating that the script that runs to enable the debugging feature has completed and that relevant program code units can then be identified. In addition, the web page includes a selectable link ("available here") that, when selected, displays an informational page about the script that runs to enable the debugging feature.

The debugging feature can be enabled in various ways. For example, the web server may provide a GUI that enables the enterprise to enable the debugging feature at a global level—meaning that thereafter, for each subsequent transaction for accessing a web-based resource, the web server may provide a region specifying relevant program code units, without the enterprise having to enable the debugging feature for each transaction. In line with the discussion above, enabling the debugging feature on the web page of FIG. 7B may cause the debugging feature to be globally enabled.

Alternatively, the web server may provide a GUI element locally present on one or more individual pages that enables the enterprise to toggle the debugging feature on or off. For example, any page that is provided as a result of a transaction to access a web-based resource may include a region such as the left-hand side of the GUI of FIG. 7B, which enables a user to search for and then enable the debugging feature for the page that has been provided as a result of the transaction. As such, if the enterprise attempts to load a web page and the web page is provided with an error, the enterprise may then use the GUI element to turn on the debugging feature, which may then cause the web server to provide, with the web page, a region specifying the relevant program code units for the attempt to load the web page.

Figure 7C:
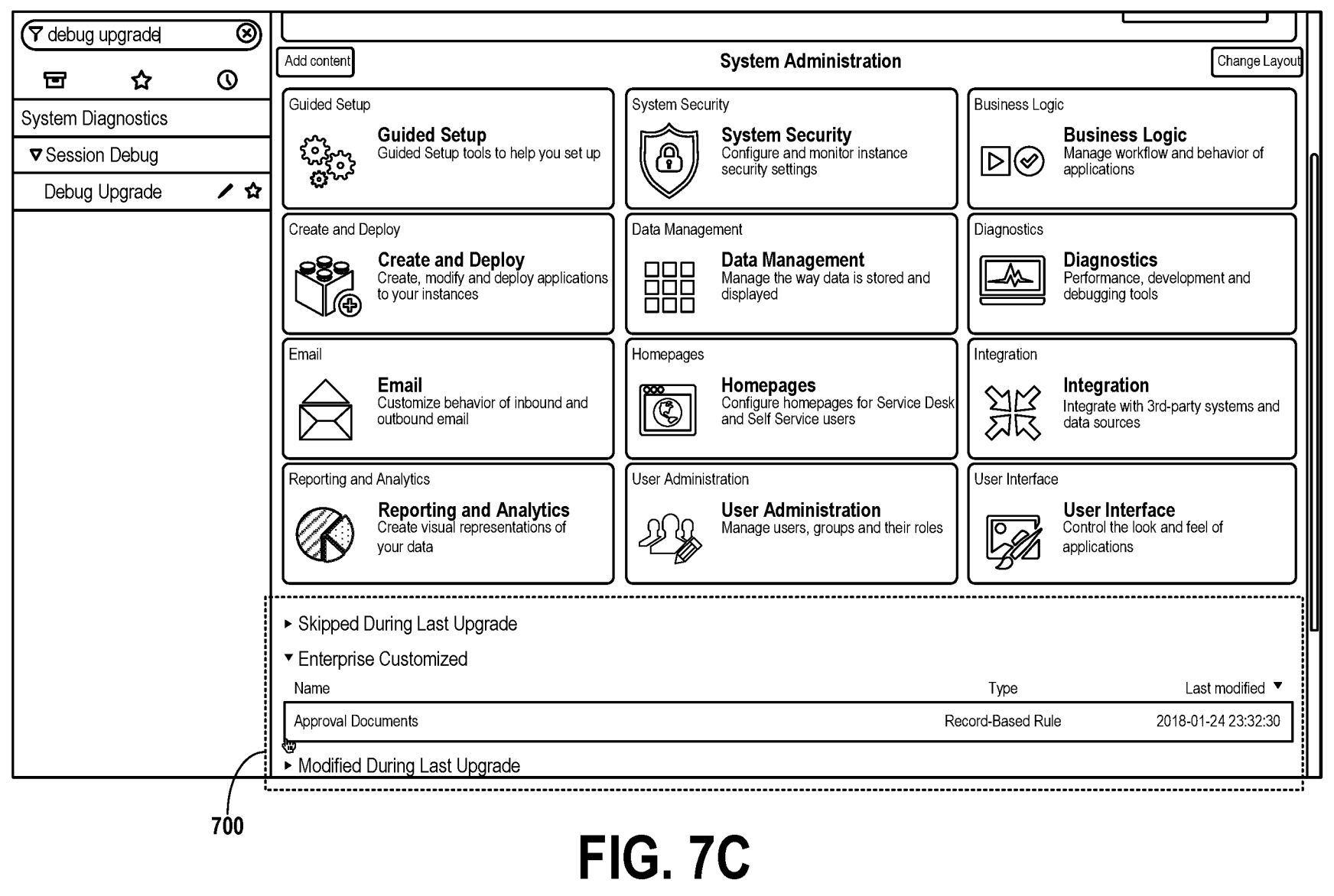

FIG. 7C is another example GUI in the form of a system administration web page provided by the web server application. In particular, shown is an example of how the system administration web page might appear after the debugging feature has been enabled. As noted above, enabling the debugging feature can be performed at a global level, or the ability to enable/disable the debugging feature can be provided locally for each web page or other attempt to access a web-based resource. In any event, because the debugging feature is enabled, Further, as shown in FIG. 7C, added to the bottom of the system administration web page is a region 700 that identifies relevant program code units, grouped into three different categories. Each of these categories can be selected to cause a drop-down list to appear, where the drop-down list includes a list of individual program code units having the selected category. The drop-down list also includes various attributes for each listed program code unit. For example, as shown, the Enterprise Customized category has been selected, and one program code unit is displayed in the drop-down list. The program code unit's name (Approval Documents) and type (Record-Based Rule) appear in the list, as well as the date and time at which the program code unit was last modified.

In line with the discussion above, the region 700 shown in FIG. 7C, as well as other pages and regions related to the debugging feature displayed when the debugging feature is enabled, may help an enterprise quickly identify where the enterprise should look to find out why a recent upgrade to the computational instance has caused one or more errors. For example, there may be numerous program code units that are executed by the web server application, but the debugging feature narrows down the executed program code units into various categories (in this case, three categories). In addition, it may be helpful for the enterprise to view the name, type, and/or date/time of last modification of each program code unit, which can further help the enterprise narrow down what caused the error(s).

In some embodiments, the program code units listed in one or more of the categories may be displayed in a particular order within their respective category. This order may be from most recently modified to least recently modified, as program code units that were modified more recently are more likely to have caused an error. Alternatively, the order may be based on the number of times the program code units were executed during the transaction (e.g., from most executed to least executed) or based on respective calculated impacts of each program code unit (e.g., from highest impact to lowest impact). These impacts may be based on the amount that each program code unit changed between versions, and/or other factors.

FIG. 7D is an example GUI in the form of a task creation web page provided by the web server application. As shown, the task creation web page includes a form with various fields (e.g., Number, Priority, Assigned to, Description, Assignment Group) that the enterprise may fill out when attempting to create a task. Various program code units, such as client scripts, may be executed to provide the task creation web page and components thereof, including the fields and values associated with one or more of such fields. For instance, the Priority and State fields may include drop-down menus including predefined values (e.g., Low or High for Priority, or Open or Closed for State). Each such menu and predefined value may be displayed as a result of an execution of one or more program code units.

Further, other program code units may define, and may be executed to implement, other aspects of task creation facilitated by the task creation web page. For example, a UI policy may define a requirement for the enterprise to fill out the Assignment Group field before the task can be created and may be defined to cause a notification to be displayed when the enterprise does not fill out that field.

In addition, the debugger feature is enabled, and thus the task creation web page of FIG. 7D includes the region 700 associated with the debugging feature. The region 700 includes the same three categories as discussed above. The enterprise may then select each such category to view a list of program code units having that category.

FIG. 7E is another example GUI in the form of a task creation web page provided by the web server application. In particular, FIG. 7E shows the region 700 when each of the three categories have been expanded to display respective drop-down lists of program code units. As shown, each category has at least one program code unit and the enterprise can view information for each such program code unit, including the program code unit's name, type, and date/time of last modification. This is yet another example of how the debugger feature can advantageously narrow down for the enterprise what caused certain errors, as opposed to the enterprise having to search through a larger set of information. By expanding the drop-down lists of information for each category, the enterprise can view one or more types of errors that occurred and that are associated with running a task creation page. In addition, for each category, the enterprise can view the names, types, and date/times associated with each program code unit having that category.

Figure 7F:
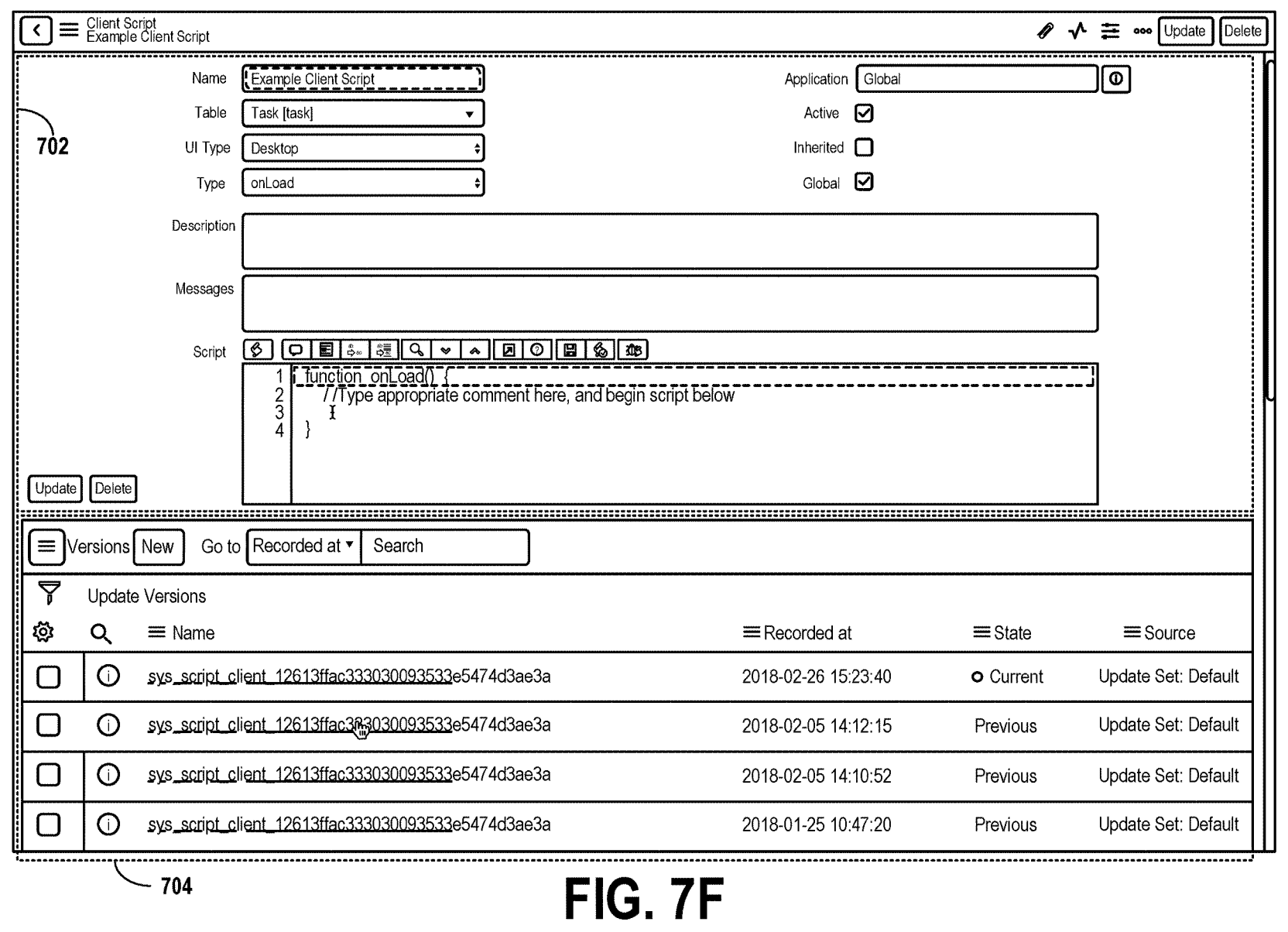

As noted above, in some embodiments, one or more of the program code units may be displayed as a selectable link. Then, upon selection of one of the program code units, the web server may enable the user to view additional and perhaps more detailed information associated with the selected program code unit. FIG. 7F is provided as an example of such functionality.

FIG. 7F is an example GUI in the form of a program code unit detailed view page that might be displayed after the enterprise has selected the Example Client Script program code unit. In particular, the detailed view page includes a first region 702 where various information associated with the Example Client Script program code unit is displayed, including a name, UI type, description, script, an indication of whether the program code unit is active, and an indication of whether the program code unit is a global program code unit, among other information as well. In this manner, the enterprise may be able to view, modify, or delete detailed information relating to the program code unit, which may help the enterprise better determine the cause of an error and subsequently fix the error. In some scenarios, for example, the detailed view page shown in FIG. 7F might enable the enterprise to edit Example Client Script so that the program code unit runs without error.

In addition, the detailed view page includes a second region 704 where a change history of the program code unit appears. As shown, the second region includes the name of each version, a date/time at which the update to the program code unit was recorded, a state of the update (e.g., Current or Previous), and a source of the update. Upon selection of any one of the versions, the web server may display, on a separate page or as part of the detailed view page, a representation of what the selected version looks like (e.g., how the script is written), and thus how the selected version is different from the most-recent version.

Figure 7G:
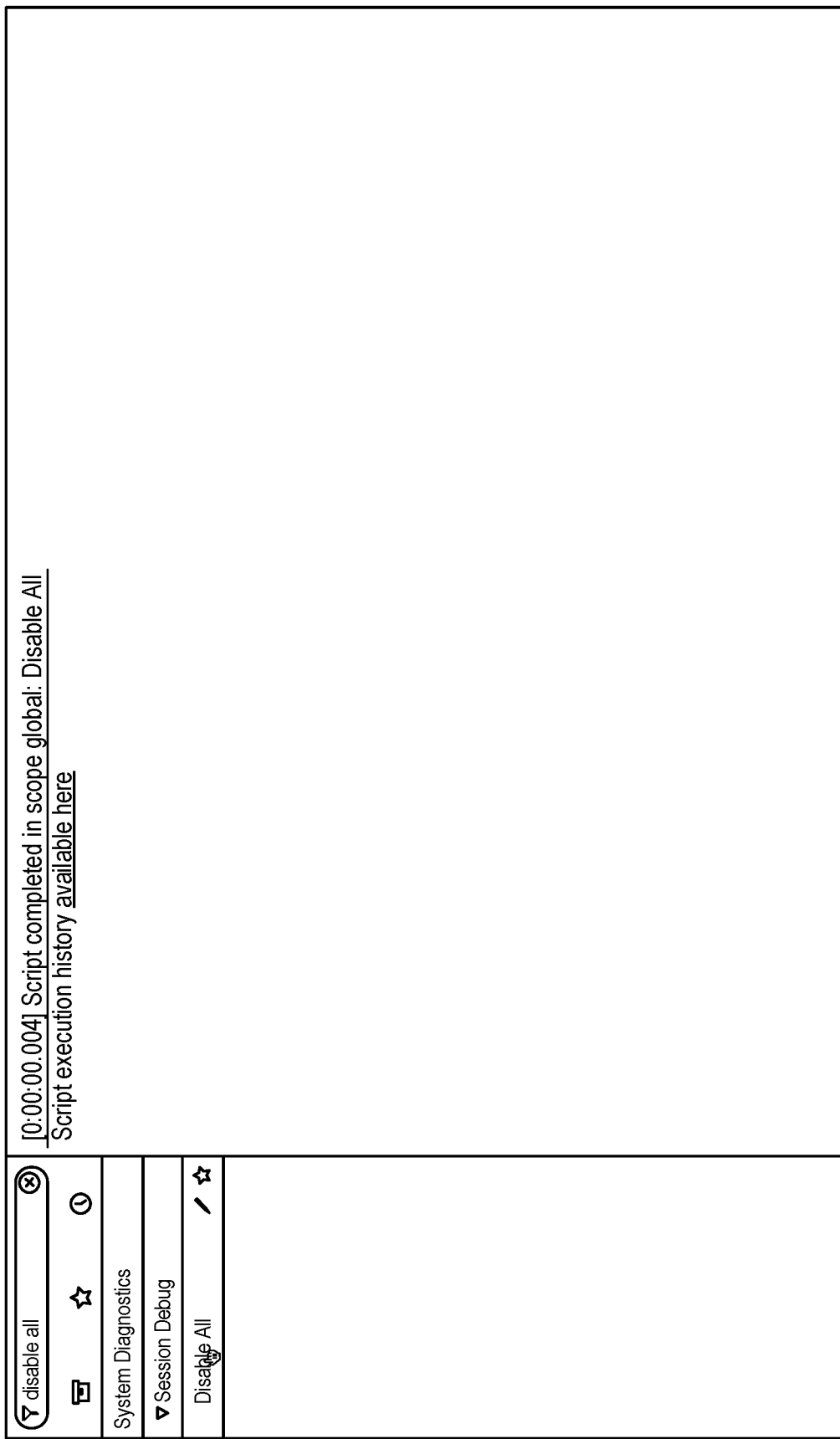
FIG. 7G illustrates a GUI, in accordance with example embodiments.

FIG. 7G is an example GUI in the form of a web page that might be displayed after the debugging feature has been disabled. As shown on the left-hand side of the web page, the enterprise has searched for "disable all," and, as a result, an option to disable the debugging feature has appeared under the heading "Section Debug." Further, the option to disable the debugging feature has been selected. Still further, as in FIG. 7B, the web page shown in FIG. 7G includes a message ("script completed in scope global") indicating that the script that runs to disable the debugging feature has completed and that relevant program code units can then be identified. In addition, the web page includes a selectable link ("available here") that, when selected, displays an informational page about the script that runs to disable the debugging feature.

At least some of the operations discussed herein may be applied in situations other than when post-upgrade transaction occurs. For example, consider a scenario where a user edits or adds a script to a current software release. The computational instance 322 may be configured to identify the change to the script and store a change indication. That way, when the user engages in a transaction that involves execution of the script and encounters an error, the user can run the debugging feature with the goal of identifying what the source of the error might be, and perhaps determine whether the changed script ran correctly. Other scenarios are possible as well.

VI. EXAMPLE OPERATIONS

FIG. 8 depicts a flow chart illustrating an example embodiment. The process illustrated by FIG. 8 is described as carried out by a web server software application executing on one or more server devices (e.g., server cluster 200). Additionally or alternatively, this process could be carried out by a computing device, such as computing device 100, a computational instance, such as computational instance 322, or another cluster of computing devices. However, the process can be carried out by other types of devices or device subsystems. For example, the process could be carried out by a portable computer, such as a laptop or a tablet device.

The embodiment of FIG. 8 may be simplified by the removal of any one or more of the features shown therein. Further, this embodiment may be combined with features, aspects, and/or implementations of any of the previous figures or otherwise described herein.

In FIG. 8, block 800 involves receiving, by a web server software application executing on one or more server devices, from a client device of a managed network, a request to access a web-based resource of a computational instance of a remote network management platform. The computational instance may be associated with the managed network. The one or more server devices may be disposed within the computational instance and may be configured to be able to execute a plurality of program code units. A software application, executing on a computing device disposed within the computational instance, may be configured to identify one or more of the program code units that, since a previous software release for the computational instance or in a subsequent software release for the computational instance, have been modified or added, and store for each of the identified program code units, a corresponding change indication.

Block 802 involves, as part of carrying out the request to access the web-based resource, executing, by the web server software application, a subset of the program code units.

Block 804 involves generating and providing, by the web server software application, for display on a web-based graphical user interface of the client device, a representation of the web-based resource that includes a region specifying each of the subset of program code units for which there is a stored change indication.

In some embodiments, the acts of the software application identifying program code units and storing change indications for the identified program code unit(s) may be performed independently from the act of receiving the request to access the web-based resource and the act of executing the subset of the program code units.

In some embodiments, the program code units that have been modified since the previous software release may include one or more program code units of the previous software release, as deployed on the computational instance, that were modified by an entity associated with the managed network. In such embodiments, the computational instance may have been upgraded from the previous software release to the subsequent software release, and further modification of the one or more program code units may have been skipped during the upgrade. In such embodiments, the region specifying each of the subset of program code units for which there is a stored change indication may comprise a listing of the one or more program code units grouped together.

In some embodiments, the program code units that have been added since the previous software release may include one or more program code units added, by an entity associated with the managed network, to the previous software release as deployed on the computational instance. In such embodiments, the region specifying each of the subset of program code units for which there is a stored change indication may comprise a listing of the one or more program code units grouped together.

In some embodiments, the program code units that have been modified in the subsequent software release for the computational instance may include one or more program code units of the subsequent software release that were modified or added, in the subsequent software release, by an entity associated with the remote network management platform. In such embodiments, the region specifying each of the subset of program code units for which there is a stored change indication may comprise a listing of the one or more program code units grouped together.

In some embodiments, the region specifying each of the subset of program code units for which there is a stored change indication may comprise attributes associated with each program code unit of the subset of program code units, and the attributes may comprise one or more of: a name of the program code unit, a type of the program code unit, or a date and time when the program code unit was modified or added.

In some embodiments, the region specifying each of the subset of program code units for which there is a stored change indication may comprise, for each of one or more program code units of the subset of program code units, a change history indicating one or more previous versions of the program code unit.

In some embodiments, the region specifying each of the subset of program code units for which there is a stored change indication may comprise, for each of one or more program code units of the subset of program code units, a selectable link that, when selected, causes the web server software application to generate and provide for display a detailed view page that includes information associated with the program code unit and enables modification of the program code unit.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
one or more server devices, disposed within a computational instance of a remote network management platform, and configured to be able to execute a plurality of program code units, wherein the computational instance is associated with a managed network;
a software application, configured to execute on a computing device disposed within the computational instance, and configured to:
identify one or more of the program code units that, since a previous software release for the computational instance or in a subsequent software release for the computational instance, have been modified or added, and
store for each of the identified program code units, a corresponding change indication; and
a web server software application, configured to execute on the one or more server devices, and configured to:
receive, from a client device of the managed network, a request to access a web-based resource of the computational instance,
as part of carrying out the request to access the web-based resource, execute a subset of the program code units, and
generate and provide, for display on a web-based graphical user interface of the client device, a representation of the web-based resource that includes a region specifying each of the subset of program code units for which there is a stored change indication.

2. The computing system of claim 1, wherein the program code units that have been modified since the previous software release include one or more program code units of the previous software release, as deployed on the computational instance, that were modified by an entity associated with the managed network.

3. The computing system of claim 2, wherein the computational instance was upgraded from the previous software release to the subsequent software release, and wherein further modification of the one or more program code units was skipped during the upgrade.

4. The computing system of claim 2, wherein the region specifying each of the subset of program code units for which there is a stored change indication comprises a listing of the one or more program code units grouped together.

5. The computing system of claim 1, wherein the program code units that have been added since the previous software release include one or more program code units added, by an entity associated with the managed network, to the previous software release as deployed on the computational instance.

6. The computing system of claim 5, wherein the region specifying each of the subset of program code units for which there is a stored change indication comprises a listing of the one or more program code units grouped together.

7. The computing system of claim 1, wherein the program code units that have been modified in the subsequent software release for the computational instance include one or more program code units of the subsequent software release that were modified or added, in the subsequent software release, by an entity associated with the remote network management platform.

8. The computing system of claim 7, wherein the region specifying each of the subset of program code units for which there is a stored change indication comprises a listing of the one or more program code units grouped together.

9. The computing system of claim 1, wherein the region specifying each of the subset of program code units for which there is a stored change indication comprises attributes associated with each program code unit of the subset of program code units, and
wherein the attributes comprise one or more of: a name of the program code unit, a type of the program code unit, or a date and time when the program code unit was modified or added.

10. The computing system of claim 1, wherein the region specifying each of the subset of program code units for which there is a stored change indication comprises, for each of one or more program code units of the subset of program code units, a change history indicating one or more previous versions of the program code unit.

11. The computing system of claim 1, wherein the region specifying each of the subset of program code units for which there is a stored change indication comprises, for each of one or more program code units of the subset of program code units, a selectable link that, when selected, causes the web server software application to generate and provide for display a detailed view page that includes information associated with the program code unit and enables modification of the program code unit.

12. A computer-implemented method comprising:
receiving, by a web server software application executing on one or more server devices, from a client device of a managed network, a request to access a web-based resource of a computational instance of a remote network management platform, wherein the computational instance is associated with the managed network, wherein the one or more server devices are disposed within the computational instance and configured to be able to execute a plurality of program code units, wherein a software application, executing on a computing device disposed within the computational instance, is configured to identify one or more of the program code units that, since a previous software release for the computational instance or in a subsequent software release for the computational instance, have been modified or added, and store for each of the identified program code units, a corresponding change indication;
as part of carrying out the request to access the web-based resource, executing, by the web server software application, a subset of the program code units; and
generating and providing, by the web server software application, for display on a web-based graphical user interface of the client device, a representation of the web-based resource that includes a region specifying each of the subset of program code units for which there is a stored change indication.

13. The method of claim 12, wherein the program code units that have been modified since the previous software release include one or more program code units of the previous software release, as deployed on the computational instance, that were modified by an entity associated with the managed network.

14. The method of claim 13, wherein the computational instance was upgraded from the previous software release to the subsequent software release, and wherein further modification of the one or more program code units was skipped during the upgrade.

15. The method of claim 13, wherein the region specifying each of the subset of program code units for which there is a stored change indication comprises a listing of the one or more program code units grouped together.

16. The method of claim 12, wherein the program code units that have been added since the previous software release include one or more program code units added, by an entity associated with the managed network, to the previous software release as deployed on the computational instance.

17. The method of claim 16, wherein the region specifying each of the subset of program code units for which there is a stored change indication comprises a listing of the one or more program code units grouped together.

18. The method of claim 12, wherein the program code units that have been modified in the subsequent software release for the computational instance include one or more program code units of the subsequent software release that were modified or added, in the subsequent software release, by an entity associated with the remote network management platform.

19. The method of claim 18, wherein the region specifying each of the subset of program code units for which there is a stored change indication comprises a listing of the one or more program code units grouped together.

20. An article of manufacture including a non-transitory computer-readable medium, having stored thereon program instructions that, upon execution by a computing device disposed within a computational instance of a remote network management platform, cause the computing device to perform operations comprising:

receiving, from a client device of a managed network, a request to access a web-based resource of the computational instance, wherein the computational instance is associated with the managed network, wherein the computing device is configured to be able to execute a plurality of program code units, wherein a software application, configured to execute on a computing device disposed within the computational instance, is configured to identify one or more of the program code units that, since a previous software release for the computational instance or in a subsequent software release for the computational instance, have been modified or added, and store for each of the identified program code units, a corresponding change indication;

as part of carrying out the request to access the web-based resource, executing a subset of the program code units; and generating and providing, for display on a web-based graphical user interface of the client device, a representation of the web-based resource that includes a region specifying each of the subset of program code units for which there is a stored change indication.

\* \* \* \* \*